March 13, 1934.  E. J. RIMPLE  1,950,748
TRUSS TYPE TRACK LINK
Filed July 29, 1932  2 Sheets-Sheet 1
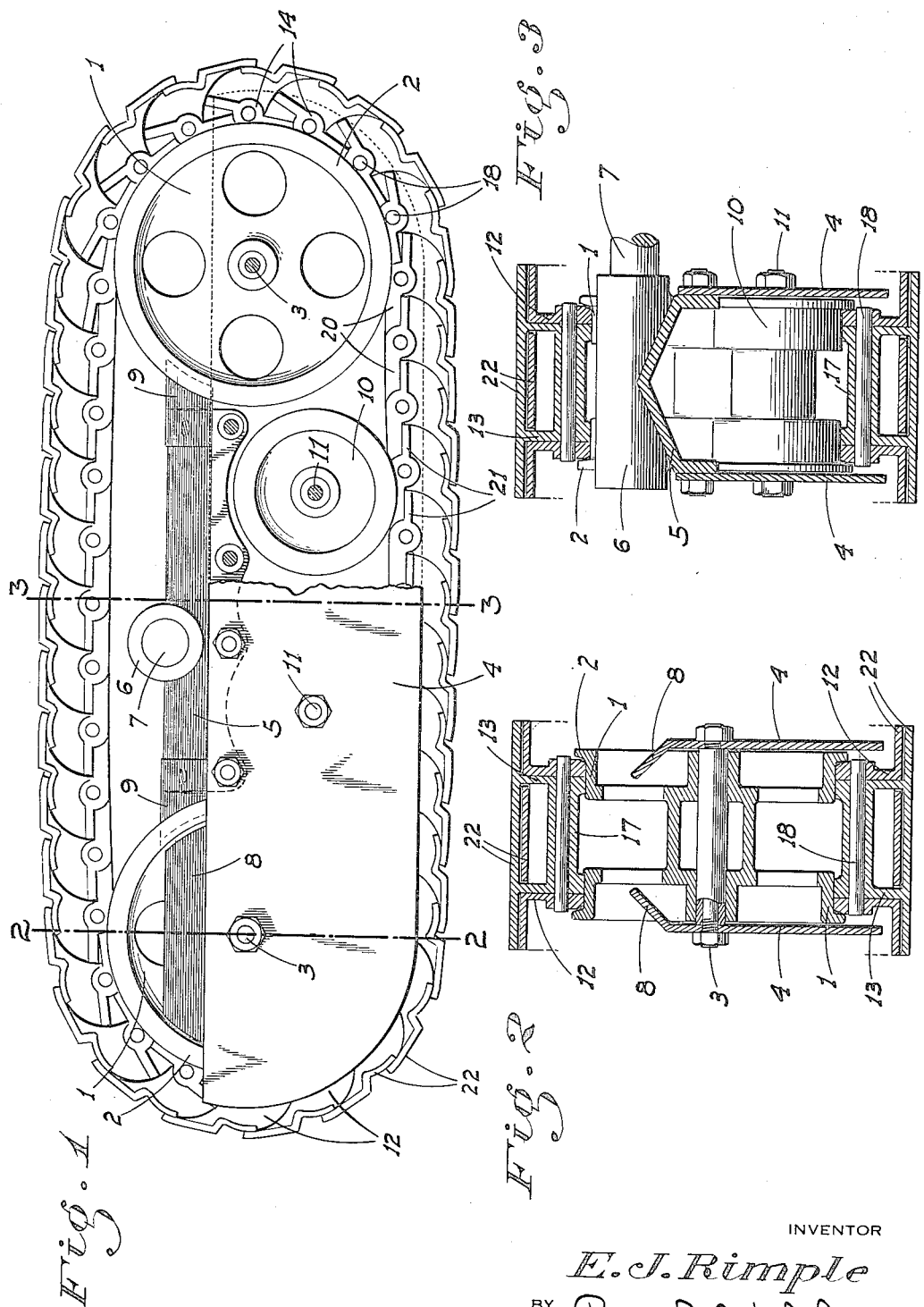
INVENTOR
E. J. Rimple
BY
ATTORNEY March 13, 1934.     E. J. RIMPLE     1,950,748
TRUSS TYPE TRACK LINK
Filed July 29, 1932     2 Sheets-Sheet 2
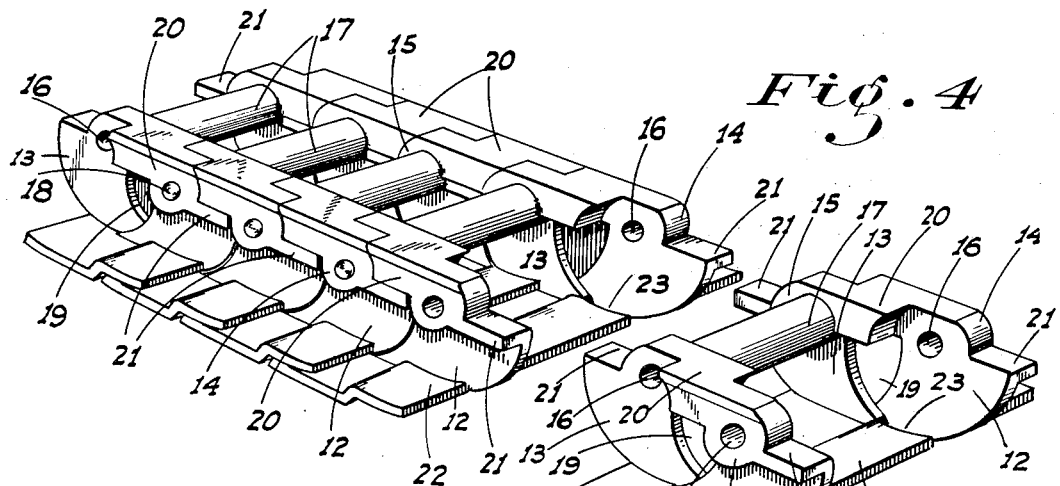
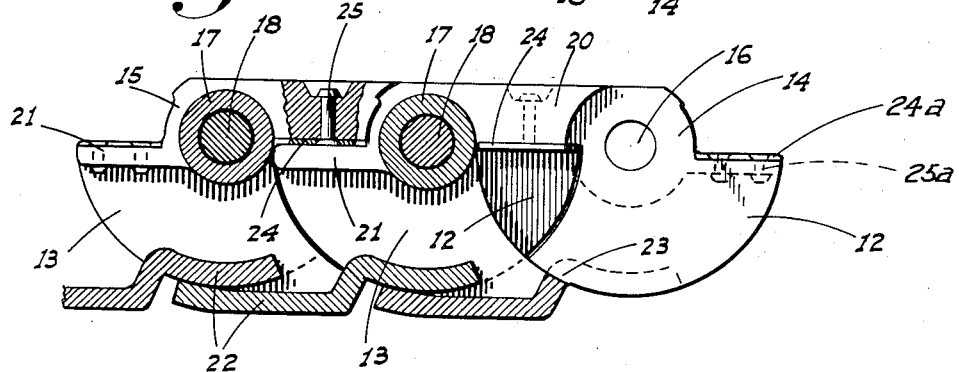
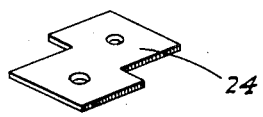
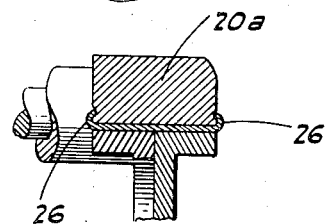
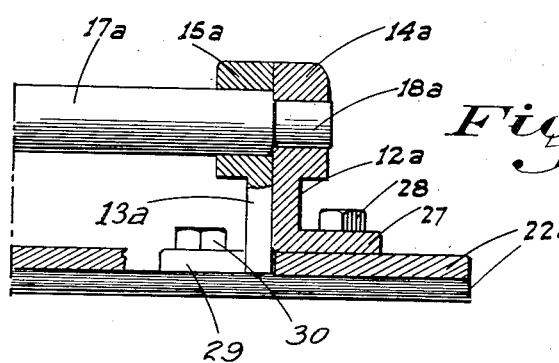
INVENTOR
E. J. Rimple
BY
ATTORNEY Patented Mar. 13, 1934

1,950,748

UNITED STATES PATENT OFFICE 1,950,748

TRUSS TYPE TRACK LINK

Edward J. Rimple, Porterville, Calif.

Application July 29, 1932, Serial No. 626,009

12 Claims. (Cl. 305—10)

This invention relates to link or endless tracks of the truss type or which are incapable of flexing in one direction.

The outstanding advantages of my link and which form the principal objects of this invention, may be mainly enumerated as follows:

1. The individual links are of short pitch and of simple design and yet have great strength. The links are therefore inexpensive to construct and are able to pass easily around small sprocket wheels or rollers so that the overall height of the track assembly will be correspondingly reduced. This is especially desirable in some types of trailers. Also clatter and noise are reduced, and greater speed is possible.

2. The links are arranged to overlap in such a manner as to give what may be termed a laminated structure having various areas of engaging surfaces which increase the strength of the track as a unit and eliminate pockets to retain foreign matter.

3. The links when alined with each other form a smooth continuous and relatively wide bearing surface for their supporting rollers, thereby greatly reducing rolling resistance.

4. Shearing strains on the connecting pins due to a load is eliminated, due to the overlapping engagement of the links which also eliminates possible oscillation of the links under load. This latter feature permits of a close fit of the side guard so that the links and all track parts may be better protected from said and grit and the resultant excessive wear.

5. The mounting structure of the track is arranged so that a minimum of dirt from the top run of the track can fall onto the parts below, thus keeping the latter clear of dirt and further lessening wear.

6. The provision of replaceable shims between the contacting flat surfaces of the links when desired enables any wear to be easily taken up so as to maintain the load supporting run of the track in slightly arched alinement.

7. Very few intermediate supporting rollers for the track are necessary in any event and in some cases they may be eliminated entirely on account of the inherent rigidity of the assembled links against flexing.

8. High speed is possible with this track due to the rigidity of the straight overlapping rails which eliminate any lateral oscillation usually had with a short link track, while the short links permit higher speed around sprockets and idlers.

9. The contacting surfaces of the links are elevated sufficiently from the shoe to eliminate the likelihood of grit entering between said surfaces.

10. Said contacting surfaces are formed as three sections, one at each end and one in the middle, and divided on each side of the pin so as to make a bearing span considerably greater than the pitch of the link. At the same time the relative movement between the surfaces themselves is reduced, thus lessening slap or hammering.

The above and other advantages will be evident from a perusal of the following description taken in connection with the accompanying drawings, and even with all such advantages the track is of simple and inexpensive construction, as previously stated.

These objects I accomplish by means of such structure and relative arrangement of parts as will fully appear by a perusal of the following specification and claims.

In the drawings similar characters of reference indicate corresponding parts in the several views:

Fig. 1 is a side elevation of a complete track assembly with one of the side plates partly broken away.

Fig. 2 is a cross section on the line 2—2 of Fig. 1.

Fig. 3 is a similar view on the line 3—3 of Fig. 1.

Fig. 4 is a perspective view of a link assembly.

Fig. 5 is a longitudinal section of a pair of links.

Fig. 6 is a perspective view of a replaceable shim detached.

Fig. 7 is a fragmentary transverse section of a link showing a modified form of shim.

Fig. 8 is a fragmentary transverse section of a pair of assembled links showing a modified form of construction.

Referring to the numerals of reference on the drawings, the endless track as a whole, the links of which are described in more detail hereinafter, are mounted on end rollers 1 having side flanges 2 to engage the outside of the track. These rollers are journaled on spindles 3 secured in side plates 4, which below the spindles extend beyond the roller flanges and over the corresponding portions of the track between the rollers.

The plates between the rollers are rigidly secured to a main frame member 5. This member is straight longitudinally but its upper surface slopes transversely in both directions down from its central transverse plane to the top edges of the plates, as shown in Fig. 3. A transverse boss 6 to receive the supporting spindle 7 is formed with the frame member above the plates and is disposed nearer to the rear roller than to the front one. The outer faces of the rollers are recessed inwardly of their flanges, as shown, the top corresponding portions of the plates are bent inwardly to project into said recesses, as shown at 8. Dirt deflecting members 9 following the slope of the upper surface of the frame are secured to the ends of the latter and project between the flanges of the rollers. The boss 6 and spindle 7 permit free oscillation of the entire assembly to adjust itself to the ground.

If the span of the rollers 1 necessitates the use of the same, idler track supporting rollers 10 to engage the lower run of the track may be disposed between the end rollers below the frame 5; said idler rollers being turnably mounted on spindles 11 secured in the plates 4. As a result of this construction the lower run of the track is well protected from damage from lateral obstructions etc. Dirt dropping off the upper run of the track is prevented from falling onto the lower run by the sloping surface of the frame which sheds the dirt over the side plates and clear of the track. The frame and plates also protect the intermediate rollers and bearings from the dirt, while the bearings of the large rollers are likewise protected by the sloping plate extensions 8 which overhang the exposed portions of the bearings and their spindles.

The boss 6 for the supporting spindle being rearwardly of the center of the track assembly, the load in the case of a trailer is equalized better when in motion than would otherwise be possible. In this case a forward pull tends to cause the front end of the track assembly to tip down. The position of the boss or the point of support with the trailer causes the load strains at the ground to be approximately at the center of length of the track assembly, and the front end of track raises easier over sudden bumps or the like.

The endless track as usual comprises a number of individual links flexibly connected together. Each link comprises a pair of transversely spaced web units, each unit consisting of a pair of longitudinally extending outer and inner webplates 12 and 13 respectively. The webs at their adjacent ends overlap and abut against each other so that they are transversely offset a distance equal to the thickness of the web itself. Projecting outwardly from the outer web and inwardly from the inner web centrally of their ends are bosses 14 and 15 respectively provided with central pin orifices 16. The inner bosses of the two transversely spaced web units are connected by an integral sleeve 17; the pivot pin 18 of a pair of links turnably projecting through said sleeve and being driven into the orifices 16 of the outer bosses of an adjacent link, when the links are assembled.

In Fig. 8 the transverse link units are separate from each other, and the inner bosses 15a of the link are connected by a sleeve 17a driven into the same; while the outer bosses 14a of an adjacent link are connected thereto by a pin 18a projecting through the sleeve as in the first described type.

The opposite ends of the web plates are curved concentric with the adjacent orifices 16, while their adjacent ends are similarly curved on a slightly larger radius and concentric with the opposed orifices. An opening 19 is thus provided between the rib plates. By means of the above described arrangement it will be seen that the outer web of one link is assembled in overlapping relation to the inner web of an adjacent link; their adjacent edges being close to each other but having the necessary clearance relation. Thus when the track links are all assembled the openings 19 are closed and the web faces form a straight and practically continuous surface, while the webs of the different links lie in transversely laminated relation to each other.

The top edge of each web unit is formed as a flat relatively wide surface to engage the supporting rollers 1 and 10, this surface being parallel to a line drawn through the centers of the orifices 16. This surface is formed by side rails 20 disposed substantially tangent to the bosses on the same side as said bosses and projecting toward each other, so that the bosses may be said to be part of the rails as well as of the webs. The side rails are thus transversely offset by overlapping each other lengthwise, and merge into each other to give the continuous flat surface as above mentioned. The outer ends of the offset rails are concentric with the adjacent orifice 16, and have a radius slightly greater than the bosses. Said rail units or flat surfaces are therefore of zigzag or Z shape in plan, as shown. When the links are assembled however the rails fit in with each other, as will be evident, and make a practically continuous surface as shown in Fig. 4.

Projecting toward the ends of the link from the adjacent bosses and on the same side and substantially radial therewith are lateral ribs 21 parallel to and substantially on the same level as the axial line between the orifices 16. The outer surfaces of these ribs and the corresponding edges of the webs form flat bearing surfaces for cooperating engagement with the under sides of the rails of adjacent links, which under sides are flat and are disposed in substantially the same plane relative to said axial line as are the outer faces of the ribs. The under side of the rails forms the top side of the opening 19 so that said under side may be completely machined or otherwise finished from either side of the link if accurately machined surfaces are desirable.

When the links are assembled therefore they are disposed in a substantially straight line when bearing on the ground and are held from flexing upwardly. On account of the arrangement and distribution of the flat bearing surfaces relative to the pivot pins, oscillation is prevented and the links are supported against flexing on opposite sides of the pins both lengthwise and transversely, and the total length of the bearing surface is longer than the pitch of a link. A slight arch of the track as shown in Fig. 1 is desirable.

Strains on the connecting pins are therefore minimized and practically eliminated, and they are only necessary to prevent longitudinal displacement of the links relative to each other. While this track structure is designed particularly for trailer use it is obvious that the connecting sleeves 17 of the links provide for the necessary engagement with the driven sprocket teeth of a tractor mounted assembly. Formed with and extending between the web units is a shoe 22. This shoe is of longitudinally stepped form, the portion connected to the outermost webs being disposed on a higher level than the portion connected to the inner webs, the offset distance or height of the step being slightly greater than the thickness of the shoe itself.

From the inner faces of the outer webs inwardly the shoe is slotted from its adjacent end to the adjacent end of the inner webs, as shown at 23, for a width slightly greater than the thickness of the web. This enables the inner webs of an adjacent link to be projected into place without interfering with the shoe. If found necessary I may provide replaceable shim plates 24 to form the actual wearing surfaces of the under sides of the rails 20. This shim may be a flat plate as shown in Figs. 5 and 6 and secured to its rail by a countersunk rivet 25. On the other hand it may have up-turned side edges as shown at 26 in Fig. 7, said edges being adapted to be sprung into place in grooves similarly positioned in the sides of the rail 20a so as to removably maintain said shim plate in place. Or they may be lightly welded so that the weld may be easily broken when replacement is necessary. Similar shims 24a, similarly secured, may be used on the upper side of the ribs 21 if desired.

In the case of the link construction in which the connecting sleeve 17a is separate from the links, as shown in Fig. 8, the shoe 22a is also separate. In this instance the outer webs 12a are provided with outwardly projecting flanges 27 adjacent their base for overhanging engagement with the adjacent portion of the shoe and to which the latter is secured by bolts 28. Also similar flanges 29 secured by bolts 30 may be secured to the webs 13a if further support is desired.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. In an endless track structure, individual links each comprising a vertical web unit, a rail along the inner edge of the unit having longitudinally spaced pin engaging holes therethrough, ribs having flat surfaces extending toward the adjacent holes from the ends of the link and on opposite sides of the web unit, said surfaces facing away from the bottom of the link, the rail having flat surfaces between said holes on opposite sides of the web unit and facing toward the bottom of the link; all said surfaces lying in substantially the same plane longitudinally of the links.

2. In an endless track structure, individual links each comprising a vertical web unit, a rail along the inner edge of the unit having longitudinally spaced pin engaging holes therethrough, ribs having flat surfaces extending toward the adjacent holes from the ends of the link and on opposite sides of the web unit, said surfaces facing away from the bottom of the link, the rail having flat surfaces between said holes on opposite sides of the web unit and facing toward the bottom of the link; said last named surfaces being disposed in a plane to be flatly engaged by the corresponding rib surfaces of adjacent links when all said links are coupled together and are disposed in longitudinal alinement with each other.

3. A structure as in claim 1, in which an opening is provided through the web unit between the holes and extending to the adjacent flat surfaces to permit of said surfaces being both machined from one side of the link.

4. In an endless track structure individual links each comprising a vertical web unit consisting of longitudinally extending laterally offset and overlapping portions, orificed bosses formed on and projecting only from the relatively opposed sides of said portions, flat surfaces facing away from the bottom of the link projecting radially from the bosses toward the ends of the link and on the same sides of the web portions as the corresponding bosses, and other flat surfaces, similarly disposed in transverse relation to and radially of the bosses, projecting toward each other from said bosses and facing toward the bottom of the link.

5. A structure as in claim 4, in which the opposite ends of the web portions are curved concentric with the adjacent bosses while their adjacent ends are curved concentric with the opposite bosses on radii substantially the same as those of the opposite ends of the web portions.

6. A structure as in claim 4, with a continuous flat surface forming the inner edge of the link extending longitudinally and laterally of the link between the bosses and substantially tangent to the adjacent periphery of the same to form a roller-engaging rail.

7. A structure as in claim 1, in which said rail is provided with a continuous flat surface extending parallel to an axial line projected between the holes and forming a roller engaging track along the inner edge of the link.

8. A structure as in claim 4, in which said first named flat surfaces include the adjacent edges of the corresponding web portions.

9. A structure as in claim 2, with replaceable shim elements secured against one set of said flat surfaces to engage the cooperating surfaces of adjacent links.

10. In an endless track structure individual links each comprising a vertical web unit consisting of longitudinally extending laterally offset overlapping portions, each portion having a pin receiving orifice therethrough, flat surfaces facing away from the bottom of the link formed on the inner edge of the web portions and extending from the orifices to the adjacent ends of the link, and other flat surfaces formed transversely of the web portions in facing relation to the bottom of the link and extending toward each other from the orifices.

11. A structure as in claim 10, in which the opposite ends of the web portions are curved concentric with the adjacent orifices while their adjacent ends are curved concentric with the opposite orifices on radii substantially the same as those of said opposite ends of the web portions.

12. An endless track structure comprising individual links each having a pair of longitudinally spaced pin orifices and a web unit comprising longitudinal portions arranged in transversely offset relationship; the opposite ends of the web portions being curved concentric with the adjacent orifices while their adjacent ends are curved concentric with the orifices in opposed relation and on radii substantially the same as those of said opposite ends of the web portions whereby when a plurality of links are assembled together, with their web portions in cooperating and overlapping relationship, the corresponding ends of adjacent portions will have a running fit with each other and will maintain such fit when the links pivot relative to each other.

EDWARD J. RIMPLE.